(12) United States Patent
Clifford et al.

(10) Patent No.: US 8,960,216 B2
(45) Date of Patent: Feb. 24, 2015

(54) DIAPHRAGM CONTROL VALVE HAVING A UNIVERSAL DIAPHRAGM MOUNTING LOCATION

(75) Inventors: Jason D. Clifford, Champlin, MN (US); Thomas W. Logan, Rogers, MN (US)

(73) Assignee: Tescom Corporation, Elk River, MN (US)

( * ) Notice: Subject to any disclaimer, the term of this patent is extended or adjusted under 35 U.S.C. 154(b) by 860 days.

(21) Appl. No.: 13/052,706

(22) Filed: Mar. 21, 2011

(65) Prior Publication Data

US 2012/0241659 A1 Sep. 27, 2012

(51) Int. Cl.
| F16K 31/365 | (2006.01) |
| F16K 51/00 | (2006.01) |
| G05D 16/06 | (2006.01) |
| F16K 41/12 | (2006.01) |
| F16K 31/126 | (2006.01) |
| F16K 27/02 | (2006.01) |

(52) U.S. Cl.
CPC ............ *G05D 16/0655* (2013.01); *F16K 41/12* (2013.01); *F16K 31/1264* (2013.01); *F16K 27/0236* (2013.01)
USPC ............... 137/15.19; 137/315.05; 137/505.42

(58) Field of Classification Search
USPC .............................. 137/15.19, 315.05, 505.42
See application file for complete search history.

(56) References Cited

U.S. PATENT DOCUMENTS

| 4,741,359 | A | * | 5/1988 | Siebald ..................... 137/505.42 |
| 5,890,512 | A | * | 4/1999 | Gotthelf et al. ............ 137/484.6 |
| 6,092,550 | A | | 7/2000 | Gotch et al. |
| 8,757,199 | B2 | * | 6/2014 | Chen et al. .................... 137/505 |
| 2002/0092565 | A1 | | 7/2002 | Muramatsu et al. |
| 2009/0250124 | A1 | * | 10/2009 | Massengale et al. ......... 137/535 |
| 2009/0283152 | A1 | * | 11/2009 | Mason ....................... 137/116.3 |
| 2011/0000553 | A1 | * | 1/2011 | Clifford .................... 137/15.18 |

FOREIGN PATENT DOCUMENTS

| BE | 764484 A1 | 8/1971 |
| WO | WO-01/04718 A1 | 1/2001 |
| WO | WO-2011/002559 A2 | 1/2011 |

OTHER PUBLICATIONS

International Search Report for PCT/US2012/025539, mailed Jun. 14, 2012.
Written Opinion for PCT/US2012/025539, mailed Jun. 14, 2012.

* cited by examiner

*Primary Examiner* — Craig Schneider
*Assistant Examiner* — Jonathan Waddy
(74) *Attorney, Agent, or Firm* — Marshall, Gerstein & Borun LLP

(57) ABSTRACT

A diaphragm control valve has a universal diaphragm mounting location, the diaphragm control valve includes a bonnet, a valve body, a diaphragm, and a clamping washer. The bonnet includes a first clamping surface that transitions into a first annular retention surface formed by a skirt, and the valve body includes a second clamping surface that transitions into a second annular retention surface formed by an upturned annular lip.

12 Claims, 3 Drawing Sheets

DIAPHRAGM CONTROL VALVE HAVING A UNIVERSAL DIAPHRAGM MOUNTING LOCATION

FIELD OF THE INVENTION

The present invention relates generally to diaphragm fluid control valves. More specifically, the present invention relates to a fluid control valve that includes a valve body and bonnet that accept different types of diaphragms to customize the control valve for systems having different fluid characteristics.

BACKGROUND

It is generally known that process plants, such as refineries, chemical plants or pulp and paper plants, consist of numerous process control loops connected together to produce various consumer products. Each of these process control loops is designed to keep some important process variable such as pressure, flow, level, or temperature, within a required operating range to ensure the quality of the end product. Each of these loops receives and internally creates load disturbances that affect the process variable and control of the process control loops within the plant. To reduce the effect of these load disturbances, the process variables are detected by sensors or transmitters and communicated to a process controller. The process controller processes this information and provides changes or modifications to the process loop to get the process variable back to where it should be after the load disturbance occurs. The modifications typically occur by changing flow through some type of final control element such as a control valve. The control valve manipulates a flowing fluid, such as gas, steam, water, or a chemical compound, to compensate for the load disturbance and maintain the regulated process variable as close as possible to the desired control or set point.

It is generally understood that various control valve configurations may be specifically applicable for certain applications. For example, when a quick-opening valve with a narrow control range is suitable, a rotary control valve, such as a butterfly valve, may be used. Alternatively, when precise control over a large control range is required, a sliding stem control valve may be used. In any configuration, such control valves are generally coupled to a control device such as an actuator, which controls the exact opening amount of the control valve in response to a control signal. Thus, when designing a process, the process engineer must consider many design requirements and design constraints. For example, the design engineer must determine the style of valve used, the size of the valve, the type of actuator, etc.

In some systems, especially in pneumatically controlled fluid process systems, the actuator for any given fluid process control device may include a diaphragm actuator. Typical diaphragm actuators comprise a housing containing a spring-biased diaphragm assembly. The diaphragm assembly is operatively coupled to a flow control element via a valve stem or other actuator rod, in order to control the opening amount of the fluid process control device.

Some operating systems require precise control of fluid flow characteristics throughout the entire operating range of the control valve. Diaphragm control valves are used for such precise control. One type of diaphragm fluid control valve includes a cage inserted within a fluid flow corridor. A control diaphragm assembly, including at least a control diaphragm, moves relative to one end of the cage, which acts as a seat, to control fluid flow through the valve. Such control diaphragm control valves are particularly advantageous for systems in which fluid flow characteristics need to precisely controlled throughout the entire operating range of the valve. Control diaphragm control valves also provide more reliable sealing in a closed position, particularly at low flow conditions.

Different types of control diaphragms may be used in the control valve based upon system requirements or characteristics. For example, high temperature systems may require a metal diaphragm to resist the high temperatures without failure. On the other hand, lower temperature systems may allow the use of an elastomeric diaphragm, which may be less costly to manufacture. Elastomeric diaphragms may also be desirable in systems where metal diaphragms could chemically react with the process fluid.

Known control diaphragm control valves are designed to use a single type of control diaphragm. For example, known control diaphragm control valves may employ either a metal diaphragm, or an elastomeric diaphragm. Generally, a metal diaphragm cannot be substituted for an elastomeric diaphragm, and vice versa, because the metal and elastomeric diaphragms have different shapes, elasticities, etc., which require different housing configurations.

DETAILED DESCRIPTION OF THE PREFERRED EMBODIMENTS

Although the following text sets forth a detailed description of exemplary embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Based upon reading this disclosure, those of skill in the art may be able to implement one or more alternative embodiments, using either current technology or technology developed after the filing date of this patent. Such additional indictments would still fall within the scope of the claims defining the invention.

Figure 1:
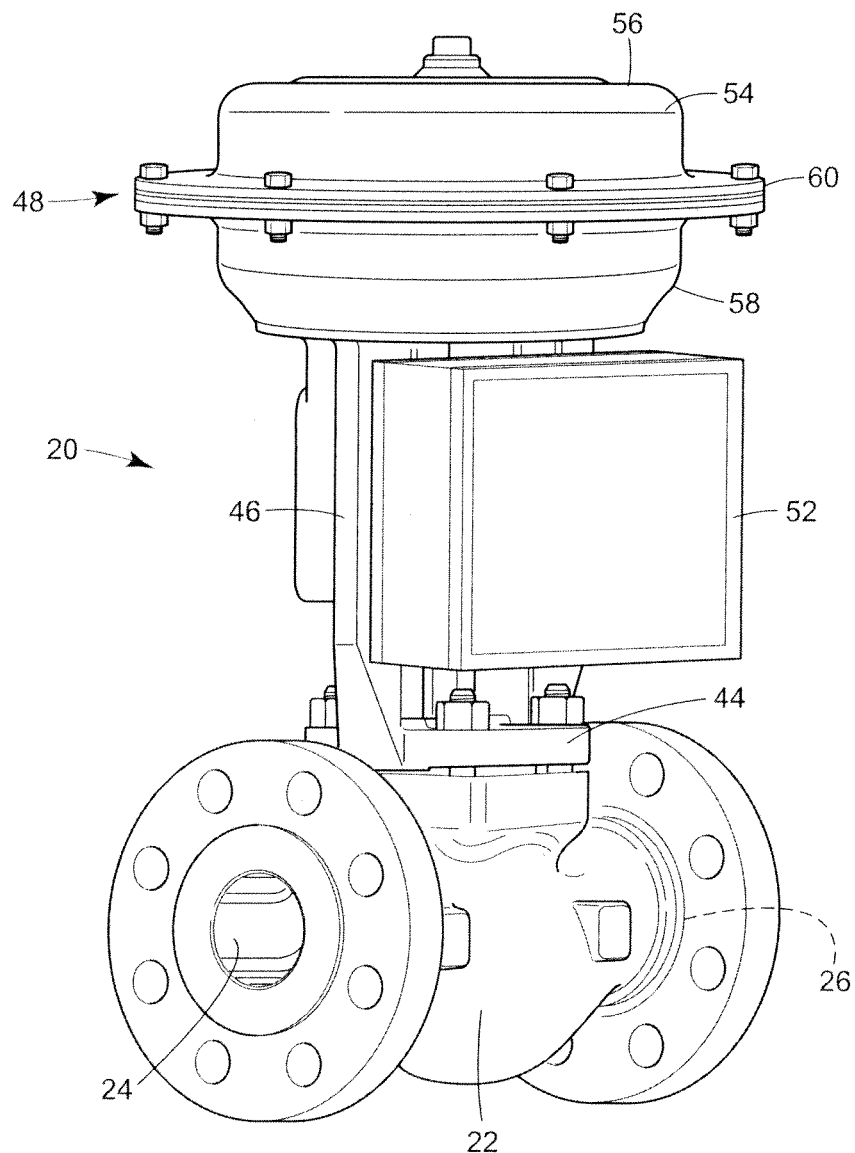
FIG. 1 is a perspective view of a diaphragm control valve constructed in accordance with the teachings of the disclosure.
Figure 2:
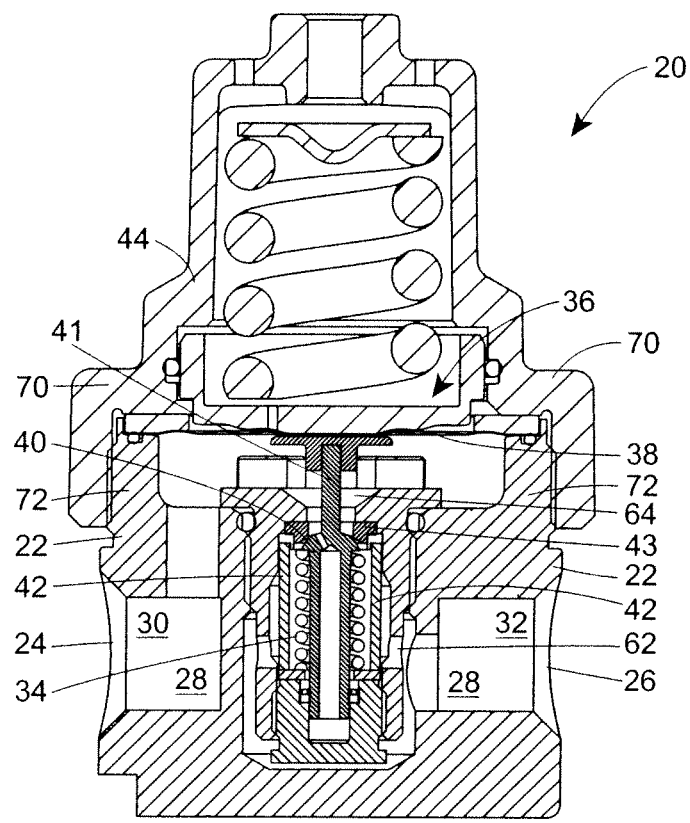
FIG. 2 is an elevational cross-sectional view of the valve portion of the control valve of FIG. 1.

Referring now to the drawings, FIGS. 1 and 2 illustrate a control valve 20 of the type commonly employed in process control systems. The control valve 20 includes a valve body 22, a valve inlet 26, a valve outlet 24, and a flow passage 28 that extends between the inlet 26 and the outlet 24. The flow passage 28 includes an inlet passage 32, an outlet passage 30, and a control passage 34.

As shown in FIG. 2, the control valve 20 includes a moveable control component 36 which, in the disclosed example, takes the form of a diaphragm 38 and a valve plug 40. The valve plug 40 is connected to a valve stem 41, and the valve plug 40 and the valve stem 41 are sized and positioned such that the valve plug 40 is disposed in the control passage 34. The control component 36 may also include a cartridge 42 that contains the valve plug 40 and a valve seat 43 that interact with one another to control fluid flow through the valve 20. The control valve 20 includes a bonnet 44, a yoke 46 (FIG. 1), an actuator 48 connected to the yoke 46, and may include a valve positioner 52. The illustrated actuator 48 is a pneumatic actuator, which may be suitably connected to the valve positioner 52 or to any other mechanism for controlling the actuator 48. The actuator 48 includes a diaphragm casing 54 having an upper portion 56 and a lower portion 58, which are joined together along a circumferential joint 60.

The actuator 50 in this embodiment is a pneumatically controlled diaphragm actuator, as is known in the art. Other actuator types may be used in other embodiments. Moreover, the actuator may be a self regulating actuator that is not dependent upon input signals from a positioned. The actuator 50 may include an internal diaphragm plate (not shown) that is suitably connected to an output shaft (not shown), and the output shaft in turn is connected to the valve stem. A suitable biasing assembly (not shown) is disposed within the actuator 48. The biasing assembly bears against the diaphragm plate. As the positioner 52 ports fluid to the upper or lower portions of the housing, the internal diaphragm moves upwardly or downwardly (as illustrated in FIG. 1), which moves the output shaft upwardly or downwardly. The output shaft, in turn, moves the valve stem which moves the valve plug 40 (FIG. 2) relative to the valve seat 43 to control fluid flow through the valve 20.

The cartridge 42 includes a cartridge inlet 62 and a cartridge outlet 64. The cartridge outlet 64 is located between the valve seat 43 and the diaphragm 38. The valve plug 40 cooperates with the valve seat 43 when the diaphragm 38 is in the closed position to prevent fluid flow through the valve 20.

The bonnet 44 may include a mounting flange 70 that overlays a mounting portion 72 of the valve body 22. A plurality of fasteners (not shown) may be used to attach the bonnet 44 to the valve body 22. In other embodiments, the bonnet 44 may be attached to the valve body 22 with other methods, such as welding, adhesives, screw threads, clamps, etc. The diaphragm 38 is secured within the valve 20 between the bonnet 44 and the valve body 22 in the vicinity of the mounting flange 70 and mounting portion 72. The bonnet 44 and valve body 22 are formed to receive different types of diaphragms 38. For example, diaphragms 38 made of different materials, diaphragms of different sizes, diaphragms of different shapes, etc. may be installed in the valve 20 based upon system requirements without the need for a new bonnet 44 or valve body 22. Thus, the disclosed control valve 20 includes a universal valve body and bonnet, as will be described further below.

Figure 3:
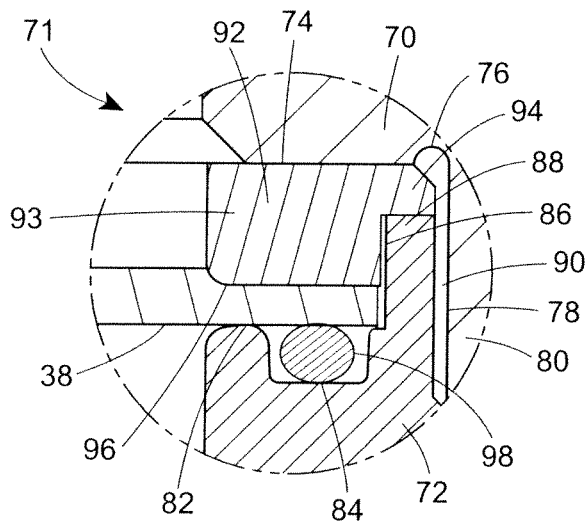
FIG. 3 is a close-up cross-sectional view of a diaphragm mounting location at an intersection of a valve bonnet and a valve body of the control valve of FIG. 2, the diaphragm mounting location includes an elastomeric diaphragm.

Turning now to FIG. 3, a mounting location 71 for the diaphragm 38 is described in more detail. The mounting location 71 in FIG. 3 includes an elastomeric diaphragm 38 disposed between the mounting flange 70 and the mounting portion 72. As discussed above, the diaphragm 38 is secured within the valve 20 in the area of the mounting flange 70 of the bonnet 44 and the mounting portion 72 of the valve body 22. The mounting flange 70 includes a substantially flat bonnet clamping surface 74 that transitions into a radiused arch-shaped surface 76 and a first annular retention surface 78. The first annular retention surface 78 is formed by an outer skirt portion 80 that extends over at least part of the mounting portion 72 of the valve body 22.

The mounting portion 72 of the valve body 22 includes a body clamping surface 82 having a recessed channel 84. The body clamping surface 82 faces the bonnet clamping surface 74. The body clamping surface 82 transitions into a second annular retention surface 86. The second annular retention surface 86 is formed by an upturned annular lip 88 in the mounting section 72. The upturned annular lip 88 is spaced apart from the first annular retention surface 78 forming an annular gap 90. The annular gap 90 allows the bonnet 44 to self center when the bonnet 44 is attached to the valve body 22. More particularly, the annular gap 90 permits the bonnet 44 and valve body 22 to move slightly relative to one another as the bonnet 44 is threaded onto the valve body 22, which creates a sound thread joint.

A portion of the diaphragm 38 is clamped between the bonnet clamping surface 74 and the body clamping surface 82. A clamping washer 92, including a washer body 93, is disposed between the diaphragm 38 and the bonnet clamping surface 74. The clamping washer 92 may preferably be formed of a durable metal to provide a metal-to-metal clamp and seal. The clamping washer 92 may include a ledge or projection 94 that extends beyond the perimeter of the diaphragm 38, between the mounting flange 70 and the upturned lip 88. Thus, the clamping washer 92 is clamped directly between the mounting flange 70 and the mounting portion 72. In this way, a metal-to-metal clamp and seal may be formed regardless of the type of diaphragm that is used. In the embodiment of FIG. 3, the diaphragm 38 is made of an elastomeric material.

The clamping washer 92 compresses part of the elastomeric diaphragm 38. The compressed portion 96 of the diaphragm may extend outward to the perimeter of the diaphragm 38 and may be thinner than the uncompressed portion of the diaphragm 38. The clamping washer 92 compresses a portion of the diaphragm 38 during assembly because a total thickness of the clamping washer 92 and the uncompressed diaphragm 38 is greater than the total height of the upturned lip 88 and a thickness of the ledge or projection 94. These relative thicknesses ensure that a portion of the diaphragm 38 is compressed when the valve 20 is assembled, resulting in a good seal between the diaphragm 38 and the valve body 22. Furthermore, the thickness of the ledge or projection 94 forms a clamping stop that provides integrity of the metal joint formed between the bonnet clamping surface 74, the ledge or projection 94, and the upturned lip 88 and the thickness of the ledge or projection 94 also prevents over-compression of the diaphragm 38. Thus, a pre-determined amount of compression may be set by the thickness of the ledge or projection 94. Additional sealing may be realized with an o-ring 98 disposed in the recessed channel 84.

In alternate embodiments, instead of an upturned lip 88, the valve body may include a step or recessed portion (not shown), into which the clamping washer 92 can lock to achieve metal-to-metal contact.

Figure 4:
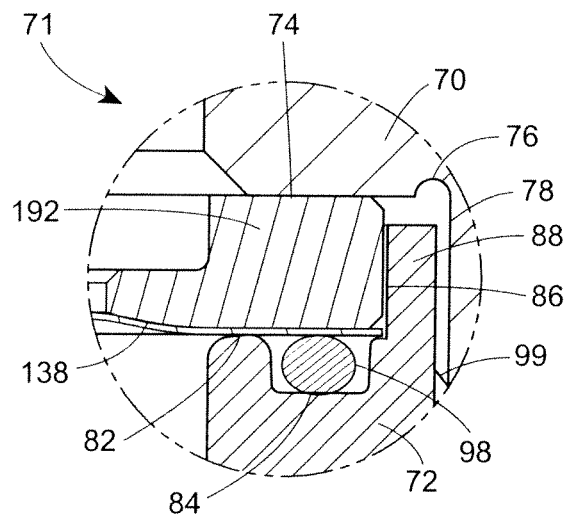
FIG. 4 is a close-up cross-sectional view of the diaphragm mounting location at an intersection of a valve bonnet and a valve body of the control valve of FIG. 2, the diaphragm mounting location includes a metal diaphragm.

FIG. 4 illustrates the mounting location 71 including a metal diaphragm 138. The metal diaphragm 138 is mounted between the bonnet clamping surface 74 and the body clamping surface 82, like the elastomeric diaphragm 38 of FIG. 3. A clamping washer 192 is disposed between the metal diaphragm 138 and the bonnet clamping surface 74. The clamping washer 192 does not include a ledge or projection, unlike the clamping washer 92 of FIG. 3. However, the mounting location illustrated in FIG. 4 still includes metal-to-metal contact to form a seal between the bonnet 44, the clamping washer 192, the diaphragm 138, and the valve body 22. A thickness of the clamping washer 192 is sufficient to prevent direct contact between the upturned lip 88 and the mounting flange 74 of the bonnet 44. In other words, a thickness of the clamping washer 192 plus a thickness of the diaphragm 192 is greater than a height of the upturned annular lip 88. As a result, proper fastener torque is maintained during valve use. Additionally, the mounting portion 72 may include a chamfered surface 99, outward of the upturned lip 88, the chamfered surface 99 may facilitate alignment during assembly of the valve 20.

The diaphragm mounting locations disclosed above provide metal-to-metal contact regardless of the type of diaphragm disposed in the mounting location. The metal-to-metal contact maintains bonnet torque, thus reducing the need to re-torque the bonnet fasteners over the life of the control valve. Moreover, the disclosed mounting locations advantageously allow substitution of different types of diaphragms without changing the bonnet or the valve body. Rather, in order to change diaphragms, only the diaphragm itself and the washer need to be changed. In this way, the disclosed mounting locations are largely universal in nature, able to accept multiple diaphragm types. This universal nature is aided by having the clamping washer thickness plus uncompressed diaphragm thickness being approximately equal for both the elastomeric diaphragm and the metal diaphragm. Additionally, the disclosed mounting locations are easily adaptable to different operating environments and the disclosed control valve may even be moved from one operating system to another operating system and only the diaphragm and washer may need to be changed. Thus, the disclosed valves and mounting locations are more flexible than previous diaphragm control valves, resulting in less of a need to stock many different types of valves. This flexibility also allows more efficient manufacturing and smaller inventory for suppliers as the supplier needs to only stock a single type of valve.

A method of assembling a diaphragm control valve includes providing a bonnet including a mounting flange and a first clamping surface that transitions into a first annular retention surface formed by a skirt, providing a valve body having a second clamping surface facing the first clamping surface, the second clamping surface transitioning into a second annular retention surface that is formed by an upturned lip, selecting one of an elastomeric diaphragm and a metal diaphragm, and clamping the selected one of the elastomeric diaphragm and the metal diaphragm between the first clamping surface and the second clamping surface.

Numerous modifications and alternative embodiments of the invention will be apparent to those skilled in the art in view of the forgoing description. Accordingly, this description is to be construed as illustrative only and is for the purpose of teaching those skilled in the art the best mode of carrying out the invention. The details of the present disclosure may be varied without departing from the spirit of the invention, and the exclusive use of all modifications which are within the scope of the claims is reserved.

The invention claimed is:

1. A method of assembling a control valve, the method comprising:
providing a bonnet including a mounting flange and a bonnet clamping surface that transitions into a first annular retention surface formed by a skirt;
providing a valve body having a body clamping surface facing the bonnet clamping surface, the body clamping surface transitioning into a second annular retention surface that is formed by an upturned lip, a gap being formed between the upturned lip and the skirt;
providing a clamping washer, the clamping washer having a body and a ledge extending outward from the body, the ledge being thinner than the body; and
clamping an elastomeric diaphragm between the bonnet clamping surface and the body clamping surface, the upturned annular lip having a height that is greater than an uncompressed thickness of the elastomeric diaphragm, the body of the clamping washer compressing a portion of the elastomeric diaphragm.

2. A diaphragm control valve comprising:
a bonnet for securing to a valve body, the bonnet including a mounting flange and a bonnet clamping surface;
the valve body having a fluid inlet, a fluid outlet, and a flow passage, the flow passage including an inlet passage, an outlet passage, and a control passage located between the inlet passage and the outlet passage, the valve body further including a mounting portion having a body clamping surface located proximate the mounting flange of the bonnet, the body clamping surface facing the bonnet clamping surface;
a diaphragm located within the control passage, at least a portion of the diaphragm being clamped between the bonnet clamping surface and the body clamping surface;
a clamping washer including a body and a ledge extending outward from the body, the ledge being thinner than the body, the clamping washer being disposed between the diaphragm and the bonnet clamping surface,
wherein the bonnet clamping surface transitions into a first annular retention surface formed by a skirt, and the body clamping surface transitions into a second annular retention surface that is formed by an upturned annular lip, and the skirt extends over at least a portion of the valve body, a gap being formed between the upturned annular lip and the skirt, and
wherein the ledge is disposed between the upturned annular lip and the bonnet clamping surface, and the upturned annular lip has a height that is greater than an uncompressed thickness of the diaphragm.

3. The diaphragm control valve of claim 2, further comprising a recessed channel disposed in the body clamping surface.

4. The diaphragm control valve of claim 3, further comprising an o-ring disposed in the recessed channel.

5. The diaphragm control valve of claim 2, wherein the diaphragm is made of an elastomeric material.

6. A diaphragm control valve comprising:
a bonnet for securing to a valve body, the bonnet including a mounting flange and a bonnet clamping surface;
the valve body having a fluid inlet, a fluid outlet, and a flow passage, the flow passage including an inlet passage, an outlet passage, and a control passage located between the inlet passage and the outlet passage, the valve body further including a mounting portion having a body clamping surface located proximate the mounting flange of the bonnet, the body clamping surface facing the bonnet clamping surface;
a diaphragm located within the control passage, at least a portion of the diaphragm being clamped between the bonnet clamping surface and the body clamping surface;
a clamping washer including a body and a ledge extending outward from the body, the ledge being thinner than the body, the clamping washer being disposed between the diaphragm and the bonnet clamping surface,
wherein the bonnet clamping surface transitions into a first annular retention surface formed by a skirt, and the body clamping surface transitions into a second annular retention surface that is formed by an upturned annular lip, and the skirt extends over at least a portion of the valve body, a gap being formed between the upturned annular lip and the skirt,
wherein the ledge is disposed between the upturned annular lip and the bonnet, the ledge having an outer diameter that is equal to an outer diameter of the upturned annular lip, and the upturned annular lip has a height that is greater than an uncompressed thickness of the diaphragm.

7. The diaphragm control valve of claim 6, wherein the diaphragm is made of an elastomeric material.

8. The diaphragm control valve of claim 7, wherein a portion of the elastomeric diaphragm is compressed between the clamping washer body and the body clamping surface, the compressed portion of the elastomeric diaphragm being thinner than an uncompressed portion of the elastomeric diaphragm.

9. The diaphragm control valve of claim 6, wherein the body clamping surface includes a recessed channel.

10. The diaphragm control valve of claim 9, further comprising an o-ring disposed in the recessed channel.

11. The diaphragm control valve of claim 6, wherein a thickness of the clamping washer body plus the uncompressed thickness of the diaphragm is greater than a thickness of the ledge plus the height of the upturned annular lip.

12. The diaphragm control valve of claim 6, wherein a radiused arch-shaped surface is disposed between the bonnet clamping surface and the first annular retention surface.

* * * * *